United States Patent [19]

Lint

[11] 4,073,049
[45] Feb. 14, 1978

[54] METHOD OF MAKING A REINFORCED FOAM-FILLED RESIN-IMPREGNATED FIBER GLASS COVERED VACUUM FORMING MOLD PLUG

[75] Inventor: Robert E. Lint, Medford, N.J.

[73] Assignee: Rohm and Haas Company, Philadelphia, Pa.

[21] Appl. No.: 544,525

[22] Filed: Jan. 27, 1975

[51] Int. Cl.² .................. B29D 3/02; B32B 31/06; B29D 27/04
[52] U.S. Cl. .............................. 29/458; 156/79; 156/245; 156/253; 264/46.5; 264/46.6; 264/156; 264/255; 264/257; 264/261; 264/263; 264/294; 264/309; 264/219
[58] Field of Search .................. 264/46.4–46.7, 264/219, 251, 254, 253, 261, 263, 269, 273, 309, 250, 255, 90, 92, 93, 156, 225, 45.1, 257, 271, 337; 425/388, DIG. 60, 405; 156/77, 78, 242, 253, 79; 29/527.1–527.3, 469, 469.5, 530; 9/6 P

[56] References Cited

U.S. PATENT DOCUMENTS

| 2,442,338 | 6/1948 | Borkland | 425/388 |
| 2,744,042 | 5/1956 | Pace | 264/261 |
| 3,005,491 | 10/1961 | Wells | 264/156 |
| 3,026,231 | 3/1962 | Chavannes | 264/92 |
| 3,124,807 | 3/1964 | Frenkel et al. | 264/92 |
| 3,139,635 | 7/1964 | Daffer | 9/6 P |
| 3,161,555 | 12/1964 | Kish | 264/227 |
| 3,235,441 | 2/1966 | George et al. | 428/117 |
| 3,290,418 | 12/1966 | Best | 264/92 |
| 3,291,874 | 12/1966 | Negoro | 264/92 |
| 3,394,208 | 7/1968 | Lovas et al. | 264/92 |
| 3,435,470 | 4/1969 | Krenzler | 9/6 P |
| 3,439,086 | 4/1969 | DeCastelet | 264/219 |

OTHER PUBLICATIONS

Anon., "Spray-Up", Modern Plastics, Sept. 1961, pp. 89–92.
Arkhangelskii et al., Fiberglass Boat Building, U.S. Dept. Commerce, Washington, D. C., (1964), pp. 81, 82, 94, 95, 100, 101.

Primary Examiner—Willard E. Hoag
Attorney, Agent, or Firm—Michael B. Fein

[57] ABSTRACT

Method of making a mold for vacuum thermoforming is made by (a) applying a polyester gel coat to a master pattern; (b) applying a rigidizing mixture of a thermosetting resin and glass to the gel coat; (c) constructing and bonding an egg crate framework to the cured thermoset resin and glass fiber mixture; (d) filling the spacings of the egg crate framework with a polymeric rigidizing foam; (e) forming a vacuum plenum on the foam-filled egg crate; (f) attaching to the vacuum plenum a means for introducing a vacuum and; (g) forming air passageways through the gel coat which communicate with the vacuum plenum.

7 Claims, 6 Drawing Figures

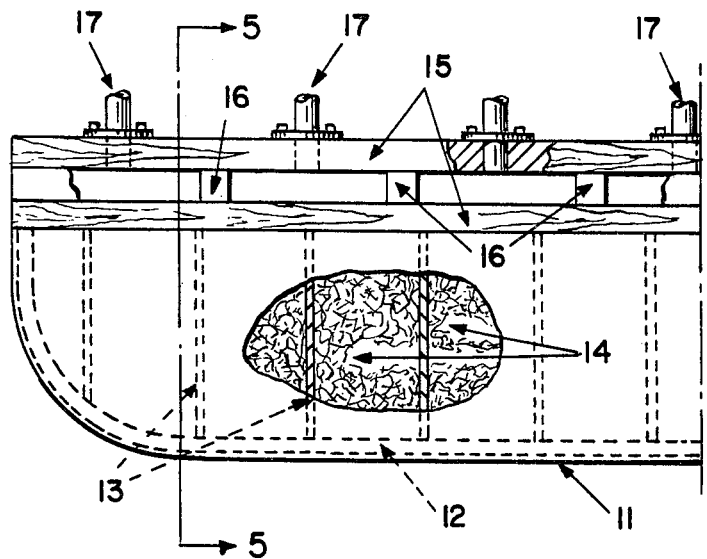
FIG. 4.
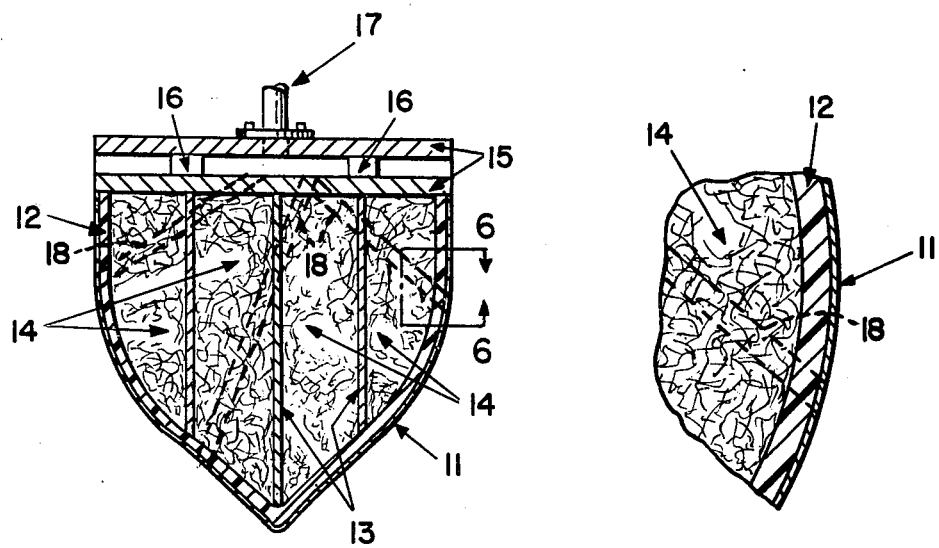
FIG. 5.
FIG. 6.

METHOD OF MAKING A REINFORCED FOAM-FILLED RESIN-IMPREGNATED FIBER GLASS COVERED VACUUM FORMING MOLD PLUG

The present invention relates to a method for making vacuum thermoforming molds useful in the creation of thermoformed articles from various plastic materials.

The production of thermoformed articles from various plastic materials, especially large articles such as, for example, boat hulls or decks, has been subject to a number of basic economic problems. Where a medium or short run of about 2000 or more articles is contemplated, it is extremely important to have a low cost method of making the mold. The use of wood or particle board in the manufacture of molds provides such a low cost factor, but this low cost is offset by the fact that molds made of such materials generally leave very noticeable marks on the plastic part due to mold surface texture, such as wood grain; further, pieces of material often break off from the molding surface, joints tend to open due to moisture content changes, the mold material often embrittles dur to heat cycling, and so forth.

The use of epoxy resin as the mold forming material provides a mold superior to that made of wood or particle board, but there are some serious problems associated with epoxy resin molds. First, due to a low stiffness modulus, epoxy-fiberglass molds have failed from distortion during repeated vacuum cycles. Secondly, epoxy resins are very expensive, particularly because they have to be made by a specialist. Cast aluminum molds are highly desirable, but their prohibitive cost and specialized manufacture makes them totally unacceptable for short or medium runs of large thermoformed articles.

Thus, what is needed is a method of making a mold which can be done in-shop using low cost material by less experienced help than is required in epoxy resin mold-making. The molds themselves must have several special features if they are to be used in production runs:

a. The surface must be smooth and free of distortions which would otherwise reproduce the defect in the hot plastic material; for example, the transfer of the grain of wood surfaces.

b. The molds must be heat resistant to withstand temperatures normally encountered in vacuum thermoforming without distorting, releasing internal gases, becoming tacky, cracking or causing any deformity of the moldable plastic.

c. The molds must be rigid enough to withstand the pressures involved in vacuum thermoforming without causing noticeable distortion of the surface or causing premature failure in the mold structure.

d. The mold should be made of a material which will take any shape when cast or formed in order to eliminate hand sculpturing.

There has been found a method of making vacuum thermoforming molds which is not only of low cost and capable of in-shop construction, but which also meets all of the above-enumerated requirements. The method involves first forming a polyester tooling gel coat upon a master pattern of the article desired to be replicated. A heavy spray-up of polyester mixed with chopped fiberglass is applied to the gel coat. An egg crate construction is then bonded to the back of this lay-up for the full depth of the mold. For further rigidity, a lightweight polymeric rigidizing foam is used to fill the spacings of the egg crate construction. A vacuum plenum is then provided on the back of the mold and air passageways are formed through the gel coat, polyester/fiberglass spray-up and foam into the vacuum plenum. The mold surface can be then finished or sanded as desired.

This invention can be more clearly understood by making reference to the drawings and the description thereof, as follows:

FIG. 4 is a side view of the complete boat hull mold showing a sectional view of the vacuum plenum;

FIG. 5 is a cross-sectional view of the complete boat hull mold along the line 5—5 of FIG. 4; and FIG. 6 is a fragmentary cut-out of the complete boat hull mold along line 6—6 of FIG. 5.

Figure 1:
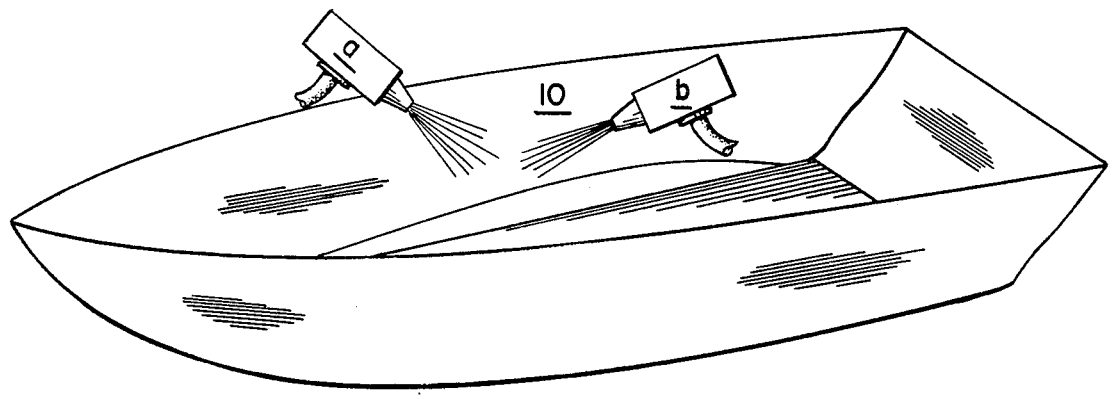
FIG. 1 is a perspective view of a boat hull master pattern being used to start mold formation.
Figure 2:
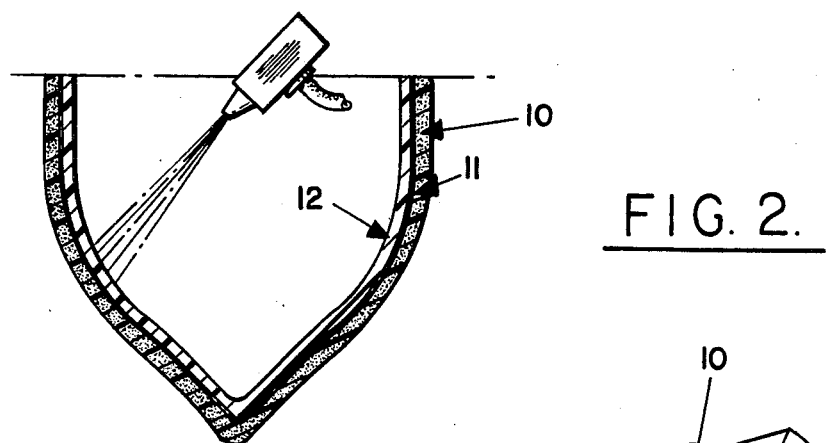
FIG. 2 is a cross-sectional view of the gel coat inside the master pattern with spraying-up of the resin/fiberglass.
Figure 3:
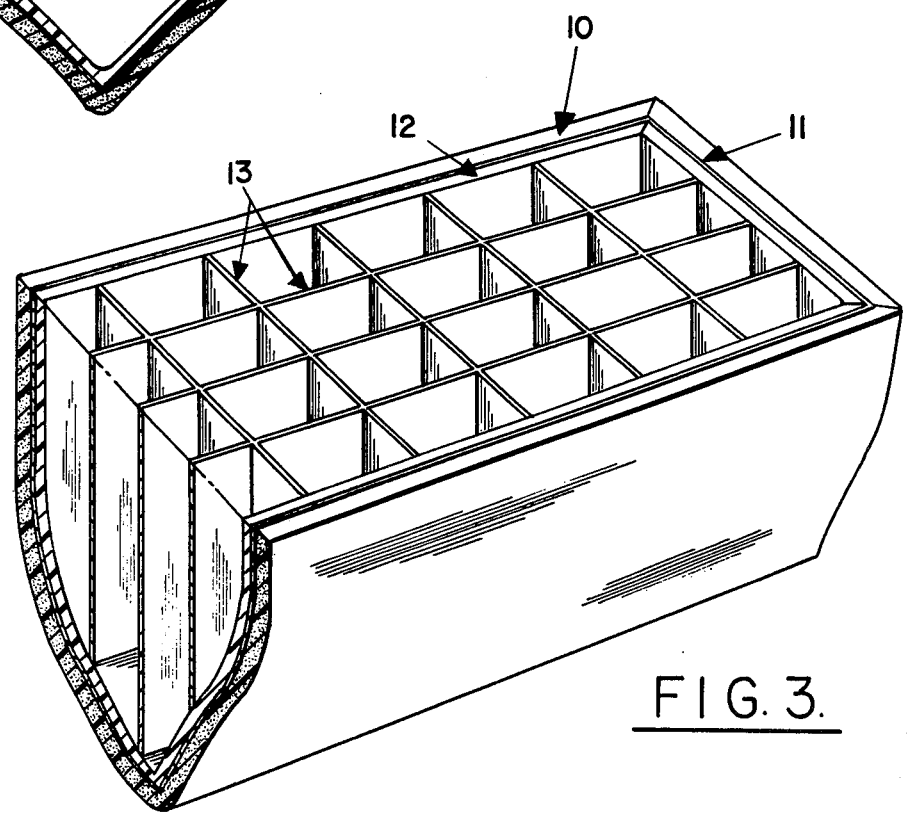
FIG. 3 is a perspective sectional view of the boat hull mold with egg-crating.

Referring to FIG. 1, a master pattern 10 of a boat hull is prepared for mold formation by first spraying on a mold release agent a followed by spraying on several layers of a plastic material b which forms the exterior gel coat of the final mold. In FIG. 2, the cured gel coat 11, still contained within the master pattern 10, is then rigidized by spraying-up a mixture of a thermosetting resin and glass fiber. This spray-up forms the rigidizing layer 12 of the mold. In order to provide a further rigidizing effect, an egg crate framework 13 as shown in FIG. 3 is then bonded to the resin/glass fiber spray-up 12 and gel coat 11 mold shell.

FIGS. 4 and 5 show in greater detail the features of the final mold structure. Thus, after bonding the egg crate framework 13 to the spray-up 12, polymeric rigidizing foam 14 is used to fill the spacings of the egg crate framework 13. With the foam filling, the basic mold is rigid enough to be parted from the master pattern 10, and requires only the formation of a vacuum plenum thereon. This vacuum plenum can be formed in a variety of ways, one of which is depicted in FIG. 4 and 5. A first capboard 15 is attached to the top of the mold, followed by spacers 16 and a second capboard 15, whereby a chamber is formed on the top of the mold. After closing and sealing the chamber, vacuum introducing means such as pipe flanges 17, are attached to the vacuum plenum. The mold structure is now complete and requires only the formation of air passageways, indicated by 18 in FIGS. 5 and 6, in order to be ready for vacuum thermoforming. FIGS. 5 and 6 show that the air passageways must extend through the gel coat 11, the rigidizing spray-up 12, the rigidizing foam 14, the egg crate framework 13, the first board 15 and on into the vacuum plenum, so that the effects of the vacuum can be felt at the mold surface.

The method depicted by the drawings is here described in greater detail:

The first step requires the formation of a polyester tooling gel coat. Therefore, a master pattern of the reverse shape of the article desired is first treated with a mold release compound, such as for example a polyvinyl alcohol or a polyvinyl alcohol-silicone material. A coat of a heat resistant polyester resin is then applied to the prepared master pattern. This gel coat is of any polyester, pigments and other processing fillers which give a composition that can be sprayed as a heavy even coat without sagging, pinholing, eyeholing or other processing defects. The polyester can be made by a condensation reaction between a dibasic acid and a dihydric alcohol, such as ethylene glycol or propylene glycol. This ester polymer is then dissolved in a reactive solvent, such as for example styrene, which crosslinks with the thermoplastic ester, making a thermoset polymer. The dibasic acid portion is usually a mixture of reactive anhydrides, such as maleic and fumaric, and unreactive anydrides, such as phthalic, isophthalic and adipic. The tooling gel coat of the present invention preferably incorporates a mixture of maleic and isophthalic anhydride for improved impact and heat resistance at the very surface of the mold where the high molding temperatures are reached. Two or more coats can be applied to provide a surface thick enough for sanding or further finishing.

A second step requires a spray-up of a standard thermosettable resin such as a polyester resin and chopped glass fiber. This spray-up should be carried out in several layers so as to prevent excessive heat build-up during the exothermic curing of the resin. The build-up of layers of fiberglass should continue to a minimum thickness of $\frac{1}{2}$ inch. Due to part configurations it will be impossible to maintain an exact uniform thickness, but the thinnest cross-section should be at least $\frac{1}{2}$ inch. The polyesters useful in the spray-up need not be of the maleic/isophthalic combination, but could be of the general purpose type, such as maleic/phthalic if long cycle times with resultant low heat build-up are anticipated. However, an isophthalic/maleic type polyester would give a better mold due to this polyester's added toughness and heat resistance.

The main reason polyester tooling has failed in the past has been due to inadequate support of the mold surface. The addition of conventional egg crate construction is helpful but is extremely difficult to do, especially when the article shape has a complex configuration. This problem has been overcome in the present invention by the expansion of conventional egg crate spacings, which in the preferred embodiment are on the order of 1 × 2 feet. The expanded egg crate, made of any durable material, such as for example, wood, is attached to the back of the spray-up for the full depth of the mold. Any suitable method of attaching the egg crate to the lay-up can be used. One suitable method is to tie the construction to the spray-up by using glass-cloth scabs and polyester resin. Once the scabs are set, a thick layer of polyester/firberglass is sprayed over the scabs and into all corners of the egg crate to complete the tie-in. The mold at this point is rigid, but not rigid enough to prevent deflection of the mold surface under the pressures encountered during a normal vacuum thermoforming operation. Thereafter, the mold is fully rigidized by filling the egg crate spacings with a polymeric rigidizing foam. The useful polymeric rigidizing foams polystyrene, polyurethanes, epoxies, phenol-formaldehyde, ebonite, poly(vinyl chloride) and so forth. In each case, the density of the foam that will provide the desired compressibility and compressive modulus will vary and densities may range from about 4 to about 7 lbs./cu. ft. A preferred polymeric foam is polyurethane with a density greater than about 5 lbs./cu. ft. Such a foam is generally sufficient to support and tie the mold together. The filling may be by spraying or pouring, and it is helpful to fill alternate spacings so as to help keep exotherm temperatures down. It may also be desirable to insert the attachments methods that will hold the mold in the press or thermoforming equipment prior to filling the mold with the foam.

Once the foam has set and shrunk, it is shaved off level with the base of the egg crate framework. At this point the mold structure is very rigid and can be parted from the master pattern. The next step is the attachment of a vacuum plenum. A capboard is attached to the base of the egg crate/foam construction with care being exercised not to allow any loss of contact under the board. This board can be of any durable material which will remain rigid under vacuum forming conditions, and a preferred material is $\frac{1}{2}$-$\mu$ inch plywood. Spacers are then attached to this capboard in order to form the vacuum plenum chamber and to provide adequate support to further prevent the deflection of the mold surface. Any of the standard spacing procedures, such as blocks of wood, grooved wood panels, urethane foam blocks, etc., can be used. The chamber is then completed by attaching a second capboard to the blocks, enclosing the chamber and sealing it off. This particular construction of the vacuum plenum chamber is merely meant to be illustrative of one method of creating a vacuum chamber on the completed mold. Thus, any other type of chamber and any other method of construction which serves to create a vacuum chamber on the mold will be just as useful and the present invention is not meant to be restricted to any specific type or construction of vacuum plenum chamber. In any event, a device for introducing a vacuum into the chamber is secured to the chamber. A common device is a pipe flange attached to and communicating with the chamber.

A final step is to create air passageways that communicate with the surface of the mold and the vacuum chamber. Thus, holes are drilled through the gel coat, spray-up, foam and into the vacuum chamber. Care must be exercised not to generate excessive heat during drilling as the foam will tend to gum and plug the hole. Generally, holes will be drilled in those areas of the mold which represent the sharp angles and indentations of the article to be molded, since such areas tend not to mold with precise fidelity unless a vacuum is drawn directly at these surface portions.

The mold is then complete except for mounting in the press or thermoforming equipment and any final finishing or sanding necessary to provide the desired mold surface.

The completed mold is very durable and is sufficiently heat resistant to withstand the temperatures normally encountered during the thermoforming cycle. It has been determined that no cooling, external or internal is required on forming plastic material 0.250 inch or less heated to 350° F. and with a total overall cycle time of 10 minutes. With a reduction of cycle time to 5 minutes, external air blasts will provide sufficient cooling. A cycle time of 5 to 3 minutes may require air spray misting or internal cooling. Any cycle time of under 3 minutes should have internal cooling placed in the mold, near the surface. The internal cooling means can be any of the conventional methods of internally cooling thermoforming molds, such as aluminum or copper tubing applied immediately to the back of the spray-up with room left for metal and plastic expansion, or even formation of cooling passageways in and through the foam of the mold so as to allow the passage of a cooling fluid. Again, no particular internal cooling method is required and appropriate methods will occur to those familiar with the art.

In addition to the advantages of this invention, which have been enumerated, those in the art will recognize others as well as certain modifications which may be made within the spirit and scope of the invention.

I claim:

1. A method for making a mold suitable for vacuum thermoforming, compressing:
   a. forming a polyester gel coat on a master pattern;
   b. applying a rigidizing mixture of a thermosetting resin and glass fiber to said gel coat and curing said resin;
   c. constructing and bonding on egg crate framework to the rigid layer, said egg crate framework defining spaces in the molds;
   d. filling the spaces defined by the egg crate framework with a polymeric rigidizing foam;
   e. forming a vacuum plenum chamber by
      i. attaching a first cap board to said polymeric foam and said crate framework; and
      ii. attaching spacers to said first cap board and a second cap board to said spacers, the first and second cap board being of a durable material which remains rigid under vacuum forming conditions;
   f. securing to said vacuum plenum chamber a means for introducing a vacuum therein; and
   g. forming air passageways through said gel coat, said rigid layer said polymeric rigidizing foam, said cap board and into said vacuum chamber, including forming some of said passageways adjacent portions of said mold corresponding to sharp angles and indentations in the molded product, thereby making said mold.

2. The method of claim 1, where a mold release agent is applied to the master pattern prior to application of the gel coat thereto.

3. The method of claim 1, where the egg crate framework is of a wood construction forming spacings of at least 2 square feet.

4. The method of claim 1, where the rigidizing mixture is applied by spraying up onto the gel coat.

5. The method of claim 1, wherein the thermosetting resin is an unsaturated polyester.

6. The method of claim 1, wherein the polymeric rigidizing foam is a polyurethane with a density greater than 5 lbs./cu. ft.

7. The method of claim 1 wherein holes are drilled into those areas of the mold which represent sharp angles and indentations of the article to be molded.

* * * * *